United States Patent
Uesugi (10) Patent No.: US 9,080,462 B2
(45) Date of Patent: Jul. 14, 2015

(54) COOLING STRUCTURE FOR BEARING HOUSING OF TURBOCHARGER

(75) Inventor: Tsuyoshi Uesugi, Kariya (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 649 days.

(21) Appl. No.: 13/404,912

(22) Filed: Feb. 24, 2012

(65) Prior Publication Data

US 2012/0237345 A1    Sep. 20, 2012

(30) Foreign Application Priority Data

Mar. 17, 2011 (JP) .................. 2011-058910

(51) Int. Cl.
| | | |
|---|---|---|
| F16C 37/00 | (2006.01) | |
| F01D 25/14 | (2006.01) | |
| F01D 25/12 | (2006.01) | |
| F02C 6/12 | (2006.01) | |
| F02C 7/06 | (2006.01) | |
| F02C 7/12 | (2006.01) | |

(52) U.S. Cl.
CPC ................. *F01D 25/14* (2013.01); *F01D 25/12* (2013.01); *F02C 6/12* (2013.01); *F02C 7/06* (2013.01); *F02C 7/12* (2013.01)

(58) Field of Classification Search
CPC ... F04D 29/047; F04D 29/061; F04D 29/106; F04D 29/108; F04D 29/126

USPC .......... 425/111–113, 180, 229–231; 384/317, 384/321, 476, 900

See application file for complete search history.

(56) References Cited

U.S. PATENT DOCUMENTS 4,704,075 A * 11/1987 Johnston et al. .............. 417/407
4,815,184 A    3/1989 Johnston et al.

FOREIGN PATENT DOCUMENTS

| | | |
|---|---|---|
| AT | 45 005 E | 12/1989 |
| CN | 101131115 A | 2/2008 |
| CN | 101336336 A | 12/2008 |
| CN | 101415920 A | 4/2009 |
| JP | 62-284922 A | 12/1987 |
| JP | 62284922 A * | 12/1987 |
| JP | 63136232 A * | 6/1988 |
| JP | 63-136232 U | 9/1988 |

* cited by examiner

*Primary Examiner* — Edward Look
*Assistant Examiner* — Yonas Alemu
(74) *Attorney, Agent, or Firm* — Sughrue Mion, PLLC (57) ABSTRACT

A turbocharger is provided with a bearing housing having a housing body supporting a rotor shaft in a rotatable state and having a bearing hole formed therein. An oil jacket is formed in the lower half portion of the housing body. A water jacket is formed in the upper half portion of the housing body, without protruding into the lower half portion.

4 Claims, 9 Drawing Sheets

PRIOR ART

COOLING STRUCTURE FOR BEARING HOUSING OF TURBOCHARGER

BACKGROUND OF THE INVENTION

1. Field of the Invention

The present invention relates to a cooling structure for a bearing housing of a turbocharger.

2. Related Background Art

Figure 8:
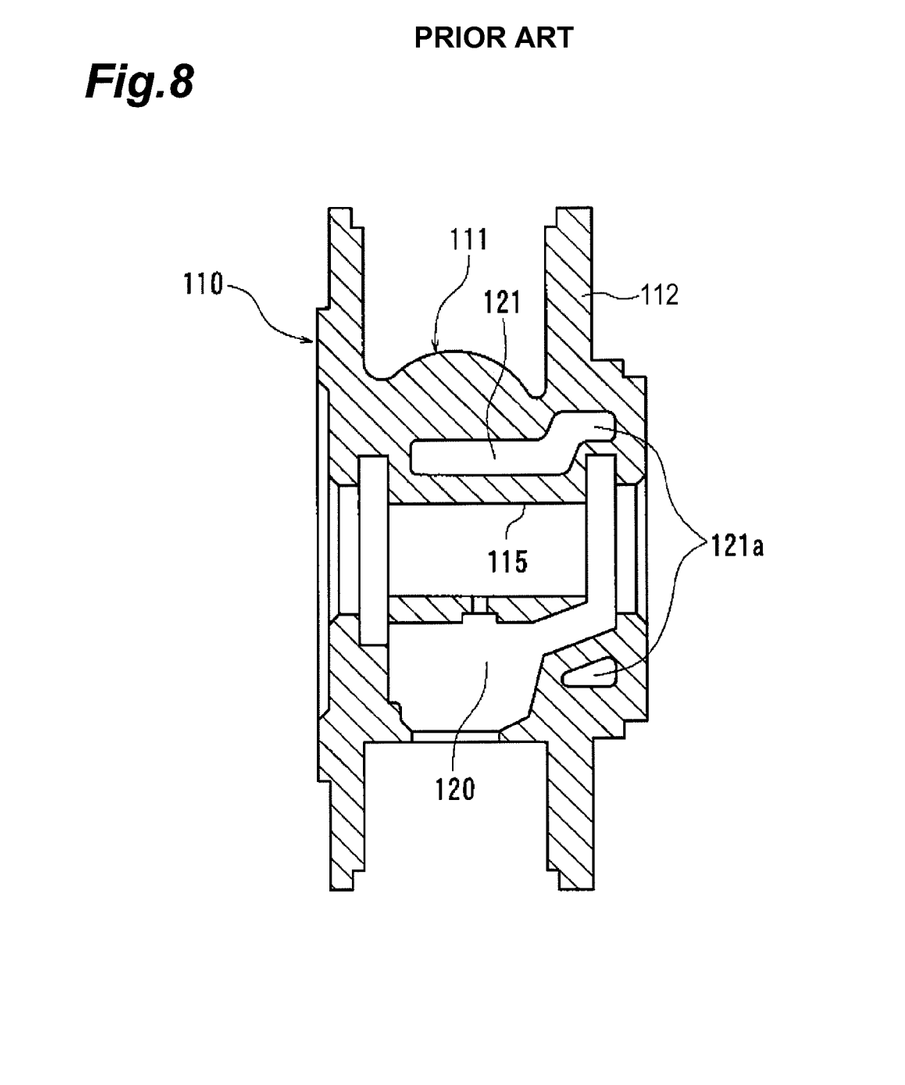
FIG. 8 is a vertical cross-sectional view showing the conventional bearing housing.
Figure 9:
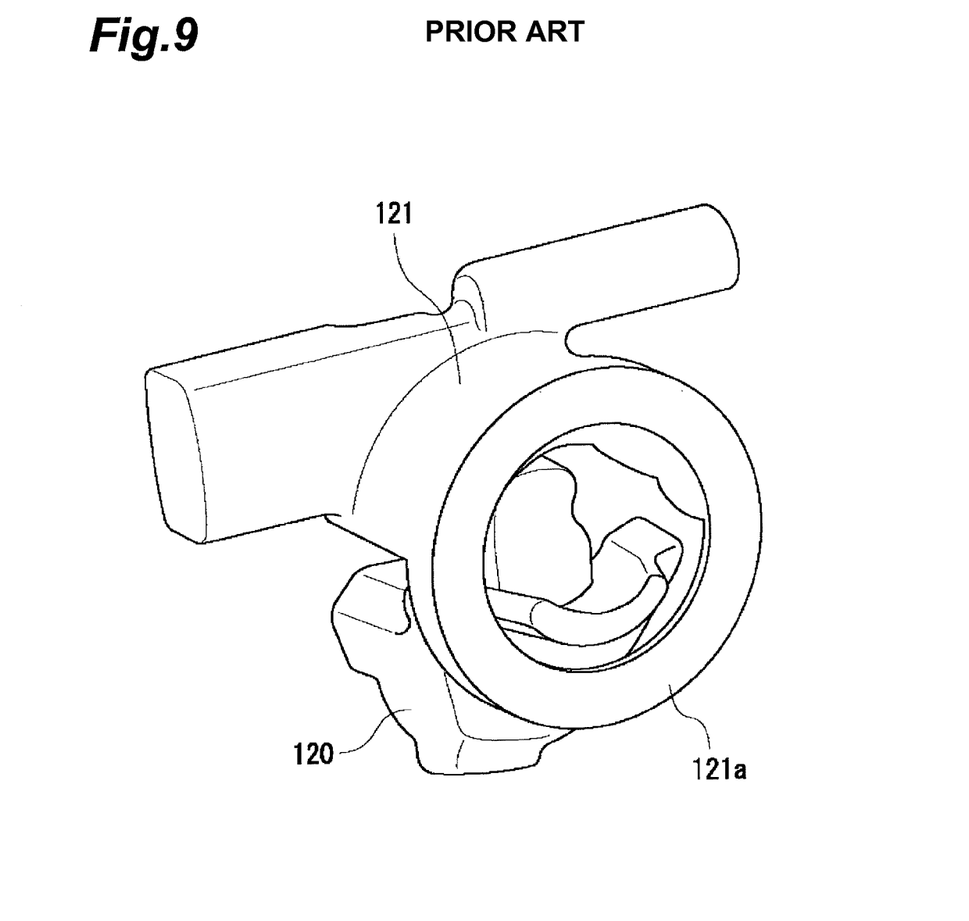
FIG. 9 is an explanatory drawing showing the oil jacket and the water jacket.

A known cooling structure for a bearing housing of a turbocharger is the structure in which an oil jacket 120 and a water jacket 121 are formed each inside a housing body 111 as the main body of a bearing housing 110, as shown in FIGS. 8 and 9, in order to increase cooling efficiency. The water jacket 121 is formed in a circular space 121a surrounding the periphery of bearing hole 115, in a portion near the end portion where a turbine-side flange 112 in the housing body 111 is formed. The cooling structure for the bearing housing of the turbocharger in which the oil jacket and the water jacket for cooling are formed each in the housing body as the main body of the bearing housing is disclosed, for example, in Japanese Patent Application Laid-open No. S62-284922.

SUMMARY OF THE INVENTION

Incidentally, in the conventional cooling structure for the bearing housing of the turbocharger shown in FIGS. 8 and 9, the bearing housing 110 is formed by casting. Since the oil jacket 120 and the water jacket 121 are simultaneously formed inside the housing body 111 of the bearing housing 110 by casting, it is necessary to prepare a complicated cast mold (particularly, at least two core molds corresponding respectively to the oil jacket 120 and the water jacket 121). Therefore, the conventional turbocharger costs much.

An object of the present invention is therefore to provide a cooling structure for a bearing housing of a turbocharger permitting easy formation of the oil jacket and the water jacket inside the housing body of the bearing housing, and achieving cost reduction.

The present invention provides a cooling structure for a bearing housing of a turbocharger, comprising: a bearing housing having a housing body supporting a rotor shaft of the turbocharger in a rotatable state and having a bearing hole formed therein, wherein an oil jacket is formed in a lower half portion of the housing body, and wherein a water jacket is formed in an upper half portion of the housing body, without protruding into the lower half portion.

In the present invention, the oil jacket is formed in the lower half portion of the housing body and the water jacket is formed in the upper half portion without protruding into the lower half portion of the housing body. This configuration simplifies the shapes of the oil jacket and the water jacket, as compared to the conventional ones. Therefore, in the case where the bearing housing is produced with a cast mold, the above configuration simplifies the shapes of core molds for simultaneous formation of the oil jacket and the water jacket inside the housing body by casting. For this reason, it becomes feasible to achieve cost reduction.

The water jacket may be configured in such a manner that a first water passage and a second water passage opening at one end portions thereof are formed in the upper half portion of the housing body by drilling and that the other end portions of the first and second water passages are in communication with each other.

Since in this case the first and second water passages are formed by drilling, the water jacket can be readily configured. There is no need for use of core molds corresponding to the first and second water passages, which achieves an effect of significant cost reduction.

Respective openings of the first and second water passages may be disposed in an adjoining relation in one side face of the upper half portion of the housing body.

Since in this case the respective openings of the first and second water passages are disposed in the adjoining relation in one side face of the upper half portion, it is easy to achieve connection between the first water passage and a supply tube and connection between the second water passage and a discharge tube.

A communication passage for communication between the other end portions of the first and second water passages may be formed by drilling from the other side face of the upper half portion of the housing body, and an opening of the communication passage opening in the other side face of the upper half portion of the housing body may be closed by a seal stop.

Since in this case the communication passage for communication between the first water passage and the second water passage is formed by drilling, the water jacket can be suitably configured.

O-rings may be arranged at respective positions on the rotor shaft near two ends of the housing body, the water jacket may be arranged near one of the O-rings, and a seal cooling portion may be formed in a part of the oil jacket on the one O-ring side.

The one O-ring is exposed to high temperatures of exhaust. Therefore, the lower half portion of the one O-ring can be effectively cooled by oil cooled by the water jacket during a fall by gravity from the upper half region. Furthermore, the upper half portion of the one O-ring is effectively cooled by the water jacket.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The preferred embodiments of the present invention will be described below in detail with reference to the accompanying drawings. In the description the same elements or elements with the same functionality will be denoted by the same reference signs, without redundant description.

Figure 1:
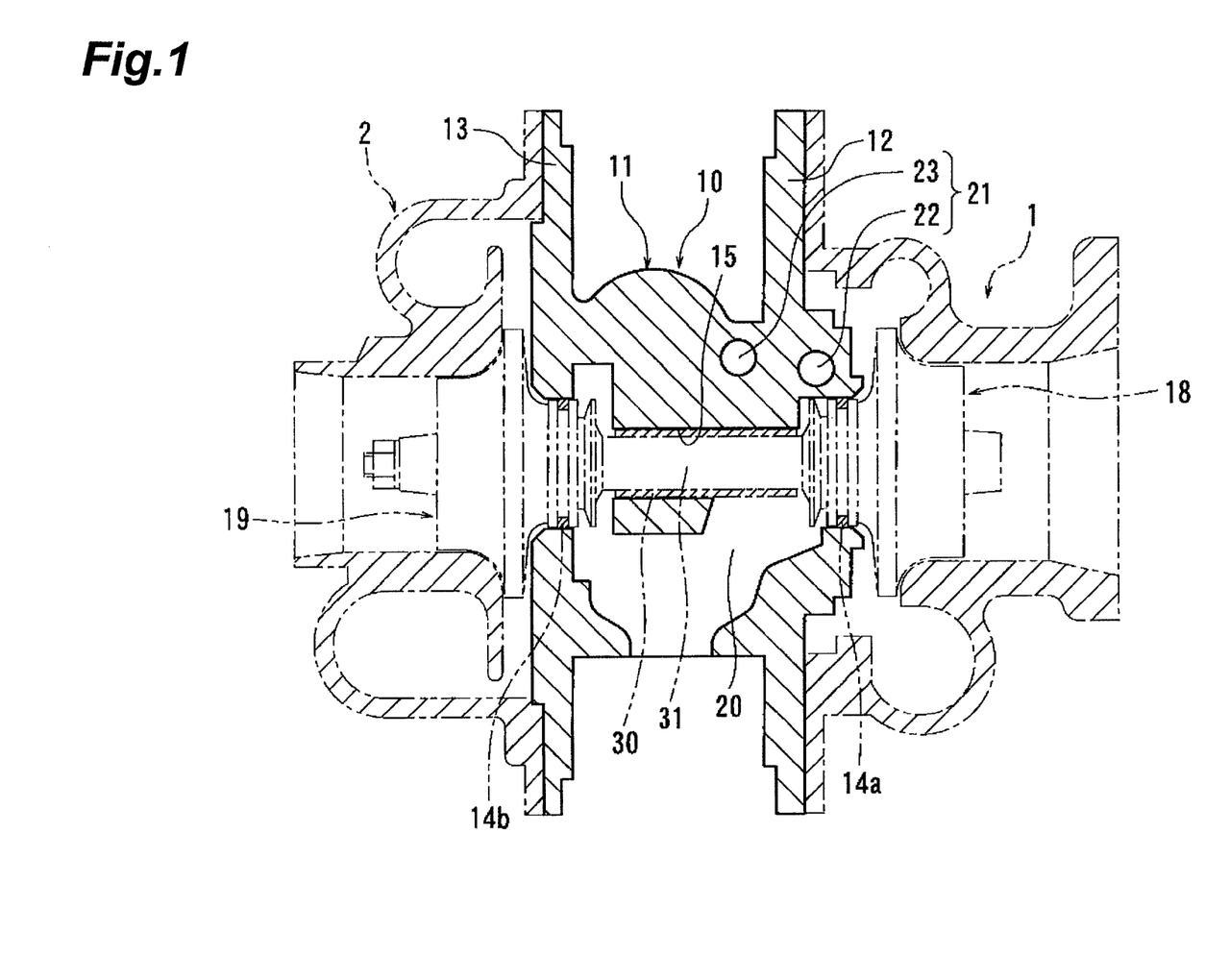
FIG. 1 is a vertical cross-sectional view showing a turbocharger employing a cooling structure for a bearing housing according to an embodiment of the present invention.
Figure 2:
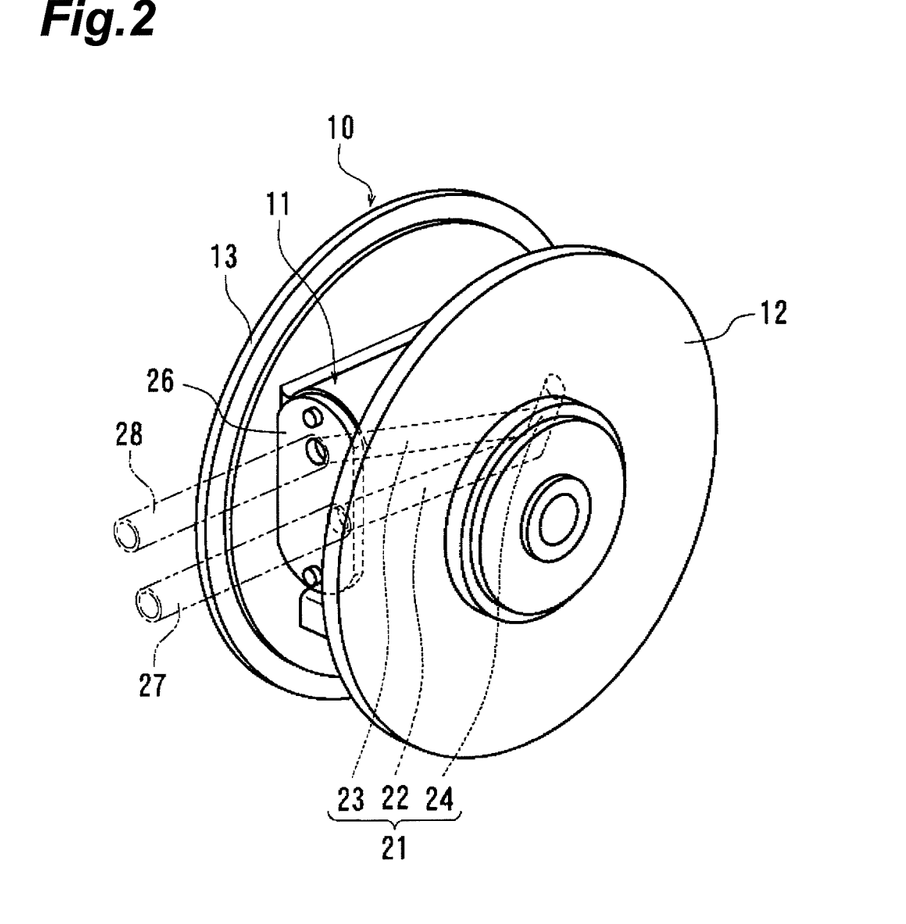
FIG. 2 is a perspective view showing the bearing housing.

A bearing structure of a turbocharger according to the present embodiment will be described with reference to FIGS. 1 to 6. As shown in FIG. 1, the turbocharger is provided with a turbine housing 1, a compressor housing 2, a bearing housing 10, a turbine wheel 18, a compressor impeller 19, and a rotor shaft 31.

The bearing housing 10 has a housing body 11 through a central region of which a bearing hole 15 is formed, a turbine-side flange 12 arranged around the outer periphery at one end portion of the housing body 11, and a compressor-side flange 13 arranged on the outer periphery at the other end portion of the housing body 11. The rotor shaft 31 is rotatably incorporated through a bearing member 30 in the bearing hole 15 of the housing body 11. The turbine wheel 18 is attached to one end portion of the rotor shaft 31 and the compressor impeller 19 is attached to the other end portion of the rotor shaft 31. O-rings 14a, 14b are arranged at respective positions near the two ends of the housing body 11. The O-ring 14a seals the interior of the housing body 11 from the turbine housing 1 side. The O-ring 14b seals the interior of the housing body 11 from the compressor housing 2 side. The turbine housing 1 corresponding to the turbine wheel 18 is fastened to the turbine-side flange 12 of the bearing housing 10 with bolts or the like. The compressor housing 2 corresponding to the compressor impeller 19 is fastened to the compressor-side flange 13 with bolts or the like.

Figure 5:
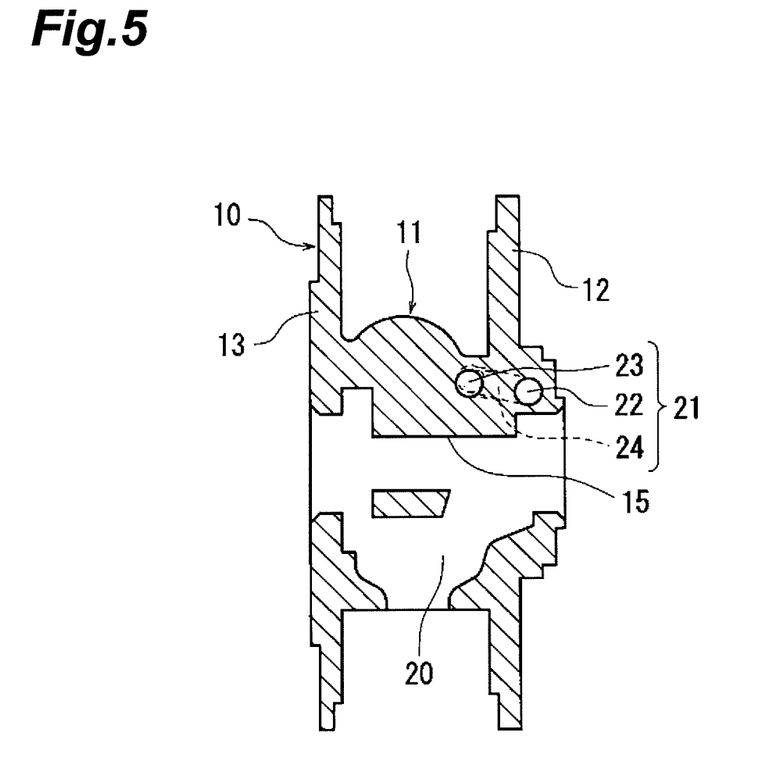
FIG. 5 is a cross-sectional view along the line V-V in FIG. 3, of the bearing housing.
Figure 6:
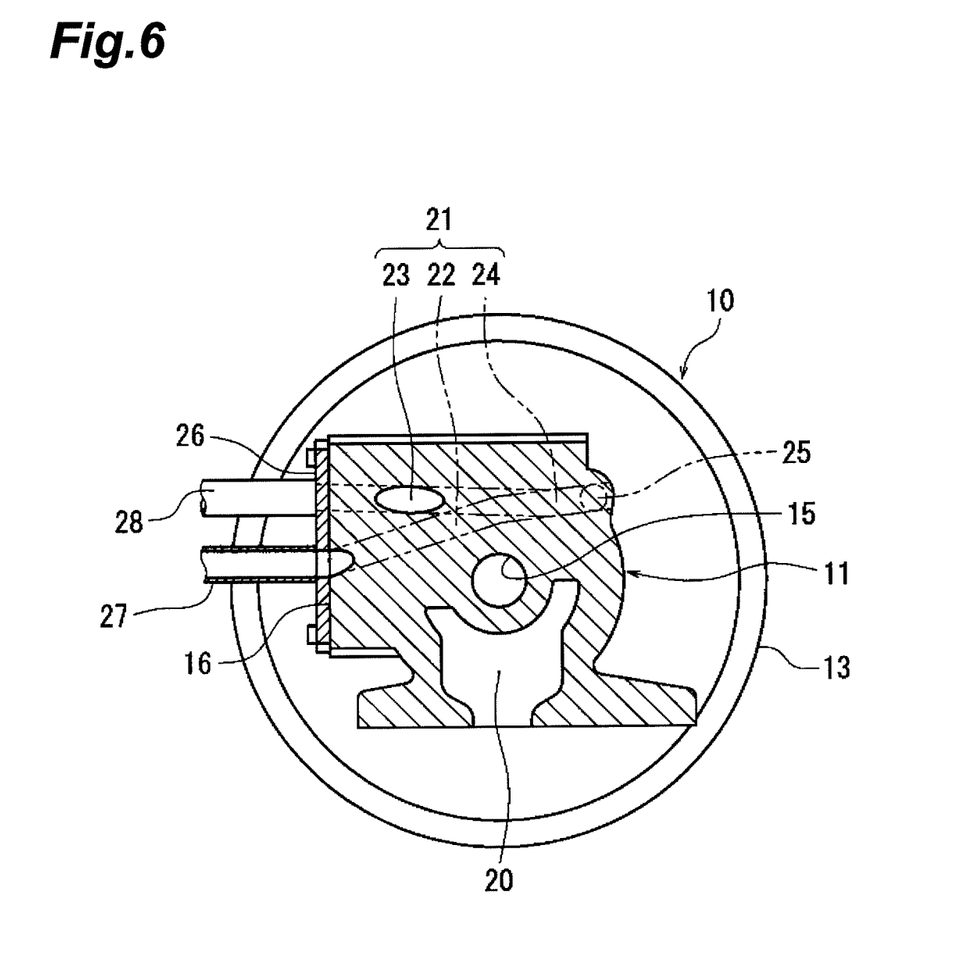
FIG. 6 is a cross-sectional view along the line VI-VI in FIG. 4, of the bearing housing.

As shown in FIGS. 5 and 6, an oil jacket 20 is formed in the lower half portion of the housing body 11 of the bearing housing 10. A water jacket 21 is formed in the upper half portion of the housing body 11, without protruding into the lower half portion. The water jacket 21 is configured in such a manner that a water passage 22 and a water passage 23 opening at one end portions thereof in one side face of the upper half portion of the housing body 11 are formed by drilling and that the other end portions of the water passages 22, 23 are in communication with each other. Namely, the water jacket 21 has the water passage 22 and the water passage 23. The central axis of the bearing hole 15 is defined as the boundary of the lower half portion of the housing body 11 and the upper half portion of the housing body 11.

In the present embodiment, a vertically flat seating face 16 is formed in one side face of the upper half portion of the housing body 11. An opening of the water passage 22 and an opening of the water passage 23 are arranged in an adjoining relation in the seating face 16. The opening of the water passage 22 is located at a slightly lower portion of the seating face 16. The opening of the water passage 23 is located at a slightly upper portion of the seating face 16. In the present embodiment, the water passage 22 is formed by drilling with a drill obliquely upward from the slightly lower portion of the seating face 16 toward the opposite side and toward one end portion of the housing body 11 on the side where the turbine-side flange 12 is arranged. The water passage 23 is formed by drilling with a drill horizontally from the slightly upper portion of the seating face 16 toward the opposite side and toward the turbine-side flange 12. Namely, the water passages 22, 23 (water jacket 21) are arranged near the turbine-side flange 12 (O-ring 14a). A connection flange 26 is attached to the seating face 16 of the housing body 11 with bolts or the like. Fixed to the connection flange 26 are an end portion of a supply tube 27 in communication with the opening of the water passage 22 and an end portion of a discharge tube 28 in communication with the opening of the water passage 23. Cooling water is supplied through the supply tube 27 into the water passage 22. The water passage 22 is a supply-side water passage. The cooling water is discharged from the water passage 23 into the discharge tube 28. The water passage 23 is a discharge-side water passage. The water passage 22 and the water passage 23 are in communication with each other at the other end portions thereof, which are located on the far side when viewed in the drilling direction.

Figure 3:
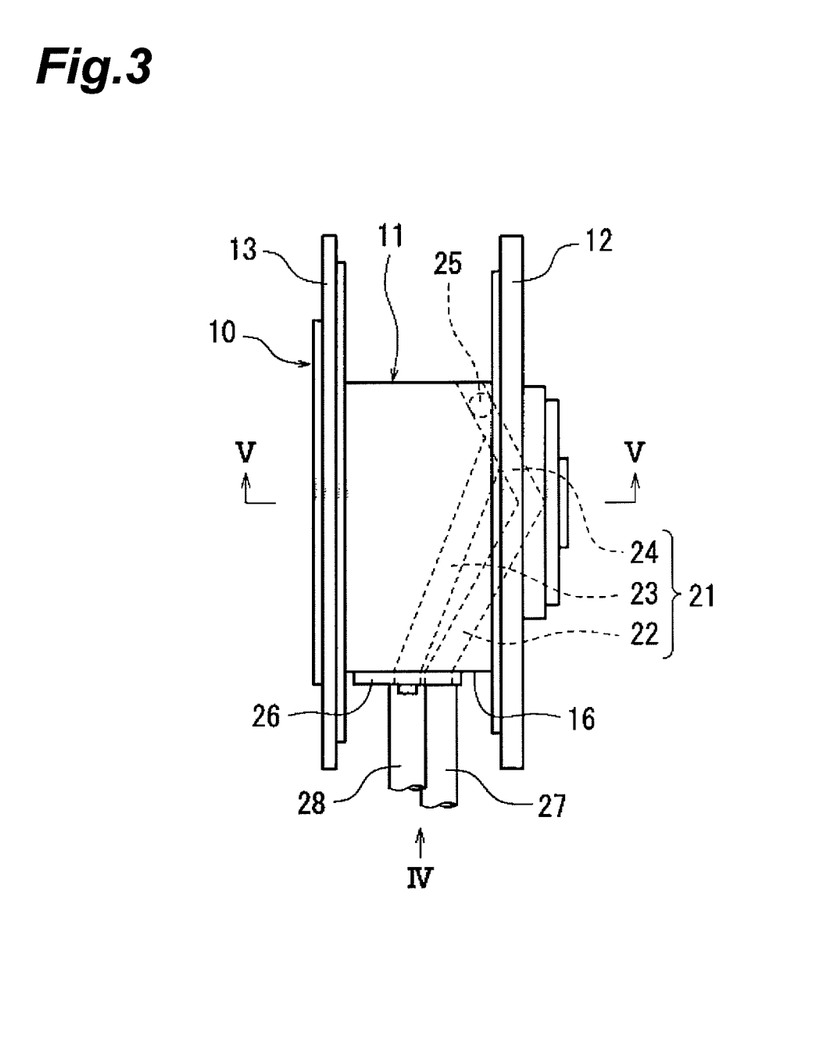
FIG. 3 is a plan view of the bearing housing.
Figure 4:
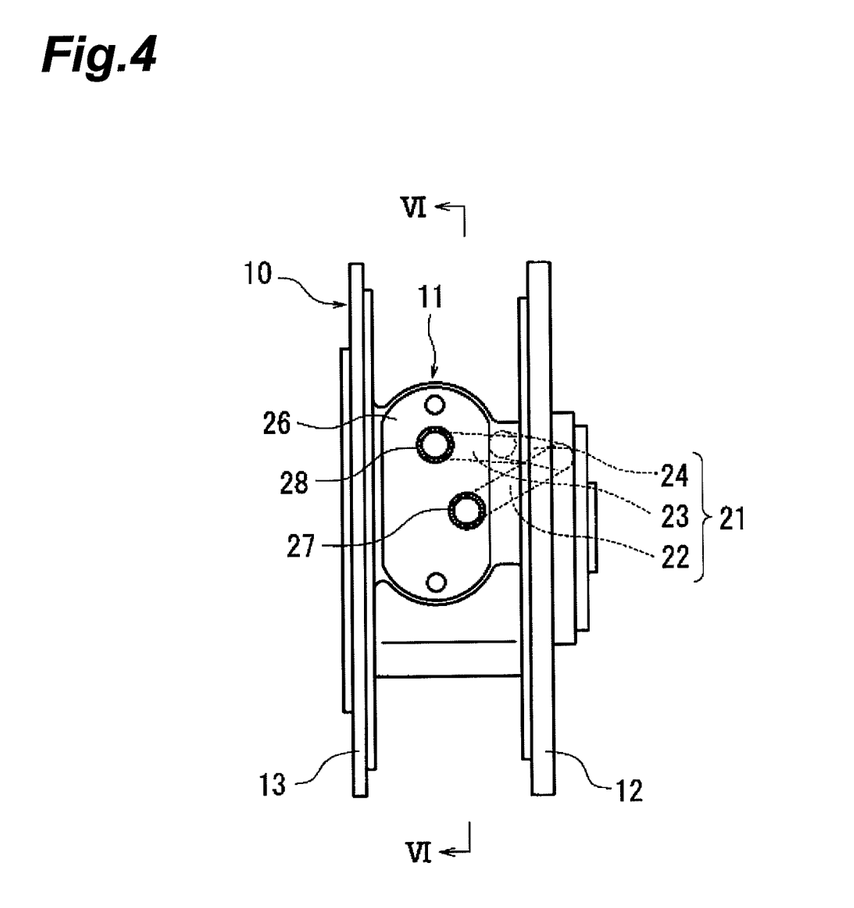
FIG. 4 is a view along the arrow IV in FIG. 3, of the bearing housing.

In the present embodiment, as shown in FIGS. 3 and 6, a communication passage 24 for communication between the respective other end portions of the water passage 22 and the water passage 23 is formed by drilling from the other side face of the upper half portion of the housing body 11. Namely, the water jacket 21 further has the communication passage 24. A seal stop 25 such as a steel ball is pressed into an opening of the communication passage 24 opening in the other side face of the upper half portion of the housing body 11 so that the opening is hermetically closed.

The cooling structure for the bearing housing of the turbocharger according to the present embodiment is configured as described above. Accordingly, the oil jacket 20 is formed in the lower half region of the housing body 11 and the water jacket 21 is formed in the upper half portion without protruding into the lower half portion of the housing body 11, whereby the shapes of the oil jacket 20 and the water jacket 21 are made simpler. The water jacket 21 is readily constituted by the supply-side water passage 22 and the discharge-side water passage 23 and the communication passage 24 for communication between the other end portions of the two water passages 22, 23 which are formed by drilling. For this reason, there is no need for use of core molds corresponding to the water jacket, which achieves an effect of significant cost reduction.

The opening of the water passage 22 is arranged adjacent to the lower portion of the seating face 16 formed in one side face of the upper half portion of the housing body 11, and the opening of the water passage 23 is arranged adjacent to the upper portion of the seating face 16. For this reason, when the connection flange 26 is attached to the seating face 16 of the housing body 11 with bolts or the like, the supply tube 27 and the discharge tube 28 of the connection flange 26 can be connected in communication with the supply-side water passage 22 and the discharge-side water passage 23, respectively. Therefore, it is easy to achieve the connection between the water passage 22 and the supply tube 27 and the connection between the water passage 23 and the discharge tube 28.

Figure 7:
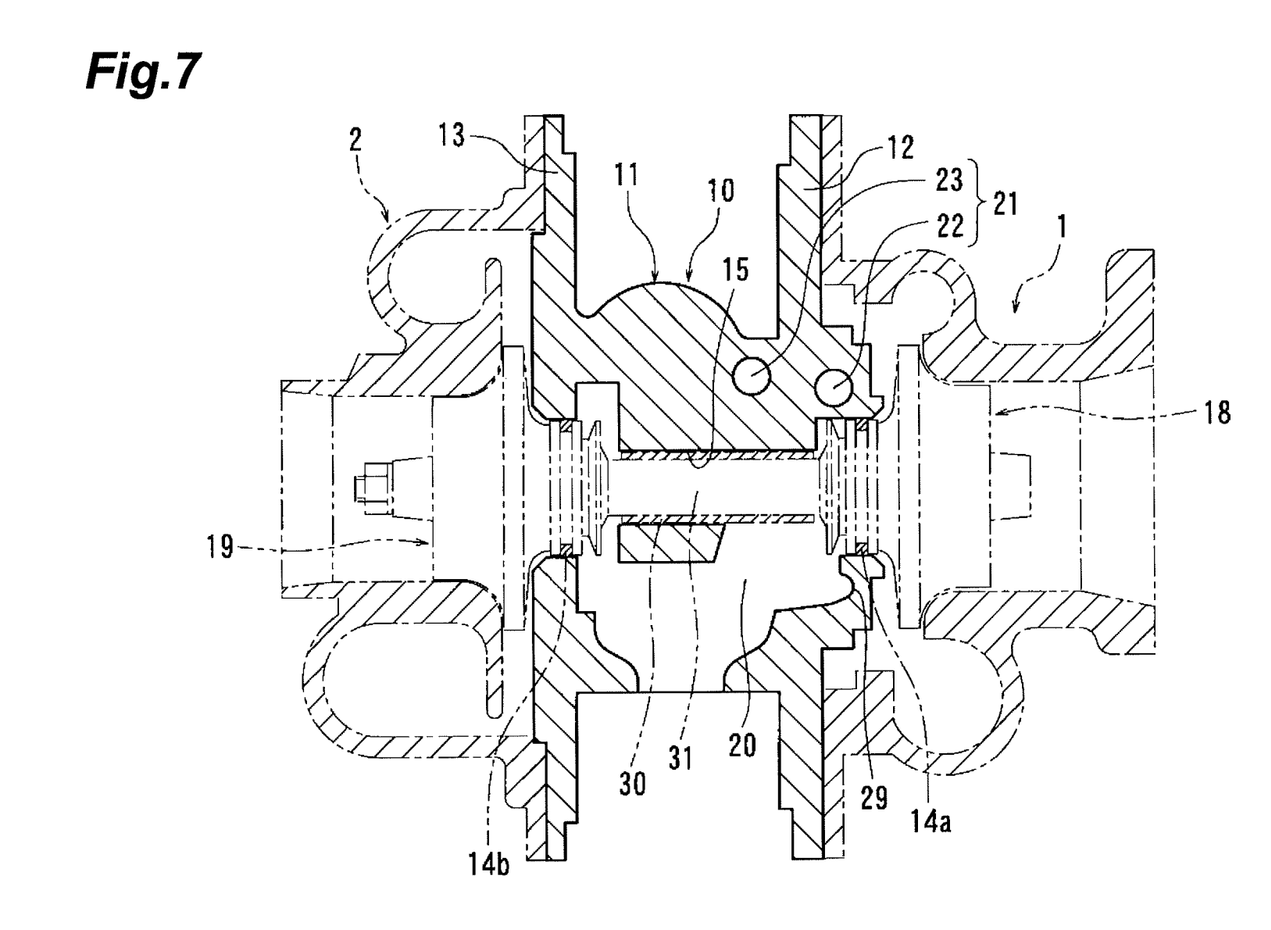
FIG. 7 is a vertical cross-sectional view showing a turbocharger according to a modification example of the embodiment.

It should be noted that the present invention is by no means limited to the above-described embodiment but can be carried out in a variety of forms, within the scope not departing from the scope and spirit of the invention. For example, the present embodiment showed the mode in which the water jacket 21 was composed of the water passage 22, the water passage 23, and the communication passage 24 each formed by drilling, but it is also possible to adopt a configuration wherein the water passage 22 and the water passage 23 are connected in direct communication between their other side portions. As shown in FIG. 7, a seal cooling portion 29 may be formed in such a shape that a part of the oil jacket 20 formed in the lower half portion of the housing body 11 bulges toward the O-ring 14a. The O-ring 14a on the turbine housing 1 side is exposed to high temperatures of exhaust. Accordingly, the lower half portion of the O-ring 14a to be exposed to high temperatures of exhaust can be effectively cooled by the oil cooled by the water jacket 21 during a fall by gravity from the upper half portion. The upper half portion of the O-ring 14a is effectively cooled by the water jacket 21 arranged near the O-ring 14a. In the present embodiment the water jacket 21 (water passages 22, 23 and communication passage 24) is formed by drilling, but the present invention is not limited to this method. The water jacket 21 may be formed using core molds. The oil jacket 20 is formed in the lower half portion of the housing body 11 and the water jacket 21 is formed in the upper half portion without protruding into the lower half portion of the housing body 11, which simplifies the shape of the water jacket 21. For this reason, even if the oil jacket 20 and the water jacket 21 are formed each with core molds in manufacturing the bearing housing 10 by casting, the casting becomes easier by the degree of simplification of the core molds than in the conventional method, so as to achieve cost reduction.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A cooling structure for a bearing housing of a turbocharger, wherein the bearing housing includes a housing body supporting a rotor shaft of the turbocharger in a rotatable state and having a bearing hole formed therein, the bearing housing being formed by casting, the cooling structure comprising:
    an oil jacket formed in a lower half portion of the housing body, and
    a water jacket formed in an upper half portion of the housing body, without protruding into the lower half portion, the water jacket including a first water passage and a second water passage each having one end portion that opens at the upper half portion of the housing body,
    wherein the first water passage and the second water passage are configured to be formed by straightly drilling the bearing housing with a cutting tool, and
    other end portions of each of the first water passage and the second water passage are in communication with each other in the upper half portion of the housing body.

2. The cooling structure for the bearing housing of the turbocharger according to claim 1, wherein respective openings of the one end portions of the first and second water passages are disposed in an adjoining relation in one side face of the upper half portion of the housing body.

3. The cooling structure for the bearing housing of the turbocharger according to claim 2,
    wherein a communication passage for communication between the other end portions of the first and second water passages is formed by drilling from an other side face of the upper half portion of the housing body, and
    wherein an opening of the communication passage opening in the other side face of the upper half portion of the housing body is closed by a seal stop.

4. The cooling structure for the bearing housing of the turbocharger according to claim 1,
    wherein the water jacket is disposed near an O-ring provided on the rotor shaft near an end of the housing body, and
    wherein the oil jacket includes a seal cooling portion which bulges toward the O-ring.

* * * * *